(12) United States Patent  
Damnjanovic et al.

(10) Patent No.: US 9,979,556 B2  
(45) Date of Patent: *May 22, 2018

(54) RESOURCE SPECIFICATION FOR BROADCAST/MULTICAST SERVICES

(71) Applicant: QUALCOMM Incorporated, San Diego, CA (US)

(72) Inventors: Jelena Damnjanovic, Del Mar, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/294,687

(22) Filed: Jun. 3, 2014

(65) Prior Publication Data

US 2014/0376438 A1 Dec. 25, 2014

Related U.S. Application Data

(63) Continuation of application No. 12/853,535, filed on Aug. 10, 2010, now Pat. No. 8,811,253.

(Continued)

(51) Int. Cl.
*H04W 4/06* (2009.01)
*H04L 12/18* (2006.01)
(Continued)

(52) U.S. Cl.
CPC .............. *H04L 12/189* (2013.01); *H04W 4/06* (2013.01); *H04W 72/005* (2013.01); *H04W 72/0446* (2013.01)

(58) Field of Classification Search
CPC . H04W 4/06; H04W 72/005; H04W 72/0446; H04W 72/04; H04H 20/71
See application file for complete search history.

(56) References Cited

U.S. PATENT DOCUMENTS 7,373,148 B2 * 5/2008 Kim .................... H04W 72/005 370/331
7,715,355 B2 5/2010 Yamagiwa
(Continued)

FOREIGN PATENT DOCUMENTS

CN 1836387 A 9/2006
CN 101502025 A 8/2009
(Continued)

OTHER PUBLICATIONS

Catt: "MSAP signalling design" 3GPP Draft; R2-093702-MSAP Signalling Design, 3rd Generation Partnership Project (3GPP), Mobile Competence Centre ; 650, Route Des Lucioles ; F-06921 Sophia-Antipolis Cedex ; France, no. Los Angeles, USA; Jun. 23, 2009, Jun. 23, 2009 (Jun. 23, 2009), XP050351939, pp. 1-3.
(Continued)

*Primary Examiner* — Hassan Phillips
*Assistant Examiner* — Prenell Jones
(74) *Attorney, Agent, or Firm* — Arnet Fox, LLP (57) ABSTRACT

Techniques for supporting multimedia broadcast/multicast services (MBMS) are described. In an aspect, resources used for MBMS services may be provided with a multi-tier structure. In the first tier, resources (e.g., subframes) used for a multicast control channel (MCCH) for MBMS services may be signaled in a system information block (SIB). In the second tier, resources (e.g., subframes) for channels carrying data for MBMS services may be signaled via the MCCH. In one design, a base station/cell may determine resources used to send a MCCH. The cell may generate a SIB comprising information indicative of the resources used to send the MCCH. The cell may send the SIB in a broadcast control channel (BCCH). The cell may send the MCCH on the resources indicated by the information sent in the SIB. The (Continued)

cell may send other channels carrying data for MBMS services based on information sent in the MCCH.

30 Claims, 8 Drawing Sheets

Related U.S. Application Data

(60) Provisional application No. 61/233,181, filed on Aug. 12, 2009.

(51) Int. Cl.
  *H04W 72/00* (2009.01)
  *H04W 72/04* (2009.01)

(56) References Cited

U.S. PATENT DOCUMENTS

| | | | |
|---|---|---|---|
| 8,270,332 B2 | 9/2012 | Aoyama et al. | |
| 2004/0202140 A1 | 10/2004 | Kim et al. | |
| 2004/0228294 A1 | 11/2004 | Kim et al. | |
| 2005/0153715 A1 | 7/2005 | Hwang et al. | |
| 2005/0245260 A1 | 11/2005 | Nielsen et al. | |
| 2005/0249141 A1 | 11/2005 | Lee et al. | |
| 2005/0272459 A1* | 12/2005 | Lee | H04B 7/2603 455/522 |
| 2006/0030342 A1 | 2/2006 | Hwang et al. | |
| 2006/0166693 A1 | 7/2006 | Jeong et al. | |
| 2007/0133456 A1 | 6/2007 | Ding | |
| 2007/0218929 A1 | 9/2007 | Kuo | |
| 2008/0102896 A1 | 5/2008 | Wang et al. | |
| 2008/0130548 A1* | 6/2008 | Kaikkonen | H04W 72/005 370/312 |
| 2008/0287127 A1 | 11/2008 | Wu et al. | |
| 2009/0213774 A1 | 8/2009 | Chapman et al. | |
| 2009/0239535 A1 | 9/2009 | Chun et al. | |
| 2010/0034161 A1 | 2/2010 | Luo et al. | |
| 2010/0157919 A1* | 6/2010 | Koskinen | H04W 72/005 370/329 |
| 2010/0183031 A1* | 7/2010 | Dalsgaard | H04W 28/06 370/474 |
| 2010/0191965 A1* | 7/2010 | Fischer | H04L 63/123 713/168 |
| 2010/0234034 A1 | 9/2010 | Aoyama et al. | |
| 2010/0272004 A1 | 10/2010 | Maeda et al. | |
| 2010/0279721 A1 | 11/2010 | Chen et al. | |
| 2010/0322135 A1* | 12/2010 | Van Lieshout et al. | 370/312 |
| 2010/0323707 A1* | 12/2010 | Huschke | H04H 20/423 455/450 |
| 2011/0194477 A1 | 8/2011 | Damnjanovic et al. | |
| 2011/0216732 A1 | 9/2011 | Maeda et al. | |
| 2011/0255486 A1 | 10/2011 | Luo et al. | |
| 2012/0314645 A1 | 12/2012 | Aoyama et al. | |

FOREIGN PATENT DOCUMENTS

| | | |
|---|---|---|
| JP | 2004312750 A | 11/2004 |
| JP | 2005525065 A | 8/2005 |
| JP | 2010516066 A | 5/2010 |
| JP | 2011509609 A | 3/2011 |
| WO | WO-2004017541 A1 | 2/2004 |
| WO | 2005117298 A1 | 12/2005 |
| WO | WO-2008084634 A1 | 7/2008 |
| WO | WO-2009092277 A1 | 7/2009 |
| WO | WO-2010145185 A1 | 12/2010 |

OTHER PUBLICATIONS

Huawei: "MBMS SIB", 3GPP TSG-RAN WG2 Meeting #66bis R2-093781, Jul. 3, 2009, p. 1-p. 3, URL, http://www.3gpp.org/ftp/tsg_ran/WG2_RL2/TSGR2_66bis/Docs/R2-093781.zip.

Samsung: "Further eMBMS control plane details", 3GPP TSG-RAN WG2 Meeting #66bis R2-093833, Jul. 3, 2009, p. 1-p. 4, URL,http://www.3gpp.org/ftp/tsg_ran/WG2_RL2/TSGR2_66bis/Docs/R2-093833.zip.

ZTE Corporation: "MSAP configuration", 3GPP TSG-RAN WG2 Meeting #66bis R2-093895, Jul. 3, 2009, p. 1-p. 2, URL, http://www.3gpp.org/ftp/tsg_ran/WG2_RL2/TSGR2_66bis/Docs/R2-093895.zip.

ZTE: "MCS configuration method", R2-093894, 3rd Generation Partnership Project (3GPP), Mobile Competence Centre ; 650, Route Deslucioles ; F-06921 Sophia-Antipolis Cedex; France, no. Los Angeles, USA; Jun. 23, 2009, XP050352094, 3 Pages.

3GPP TS 36.331: "3rd Generation Partnership Project; Technical Specification Group Radio Access Network; Evolved Universal Terrestrial Radio Access (E-UTRA) Radio Resource Control (RRC); Protocol specification" 3GPP TS 36.331 V8.6.0 (Release 8) (Jun. 2009), pp. 1-207.

International Search Report and Written Opinion—PCT/US2010/045400, International Search Authority—European Patent Office—dated Nov. 25, 2010.

Nokia Corporation et al: "MCCH for LTE", 3GPP Draft; R2-092898_MCCH_LTE, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, Apr. 28, 2009 (Apr. 28, 2009), XP050340704, [retrieved on Apr. 28, 2009] the whole document.

Taiwan Search Report—TW099126976—TIPO—dated Aug. 6, 2013.

3GPP: "TSG-RAN, E-UTRA and E-UTRAN Overall Description; Stage 2", Release 2, TS36.300 v9.0.0, Jun. 2009, pp. 82-84.

Ericsson et al., "Introducing SIB13 for MBMS specific information," 3GPP Draft; R2-096047 Introducing SIB13, 3rd Generation Partnership Project (3GPP), no. Miyazaki; Oct. 12, 2009, Oct. 12, 2009 (Oct. 12, 2009), XP050390458, [retrieved on Oct. 8, 2009].

Samsung: "E-mail Discussion on eMBMS Control Plane Details (66#19)", 3GPP TSG-RAN WG2#66bis R2-093831, Jun. 29, 2009, pp. 1-20.

* cited by examiner

RESOURCE SPECIFICATION FOR BROADCAST/MULTICAST SERVICES

The present application is a continuation of non-provisional U.S. application Ser. No. 12/853,535, entitled "RESOURCE SPECIFICATION FOR BROADCAST/MULTICAST SERVICES," filed Aug. 10, 2010, which claims priority to provisional U.S. Application Ser. No. 61/233,181, entitled "MULTIMEDIA BROADCAST MULTICAST SINGLE FREQUENCY NETWORK (MBSFN) RESOURCE SPECIFICATION," filed Aug. 12, 2009, assigned to the assignee hereof, and incorporated herein by reference.

BACKGROUND

I. Field

The present disclosure relates generally to communication, and more specifically to techniques for supporting broadcast/multicast services in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. It may be desirable to efficiently support broadcast/multicast services in the wireless network.

SUMMARY

Techniques for supporting multimedia broadcast/multicast services (MBMS) in a wireless communication network are described herein. In an aspect, resources used for MBMS services may be provided with a multi-tier structure. In the first tier, resources (e.g., subframes) used for a multicast control channel (MCCH) for MBMS services may be signaled in a system information block (SIB). In the second tier, resources (e.g., subframes) for channels carrying data for MBMS services may be signaled via the MCCH.

In one design, a base station/cell may determine resources (e.g., subframes) used to send a MCCH. The cell may generate a SIB comprising information indicative of the resources used to send the MCCH. The cell may send the SIB in a broadcast control channel (BCCH). The cell may send the MCCH on the resources indicated by the information sent in the SIB. The cell may send other channels carrying data for MBMS services based on the information sent in the MCCH.

In one design, a user equipment (UE) may receive the SIB from the BCCH. The UE may obtain, from the SIB, information indicative of the resources used to send the MCCH. The UE may receive the MCCH on the resources indicated by the information obtained from the SIB. The UE may receive other channels carrying data for at least one MBMS service of interest based on the information sent in the MCCH.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
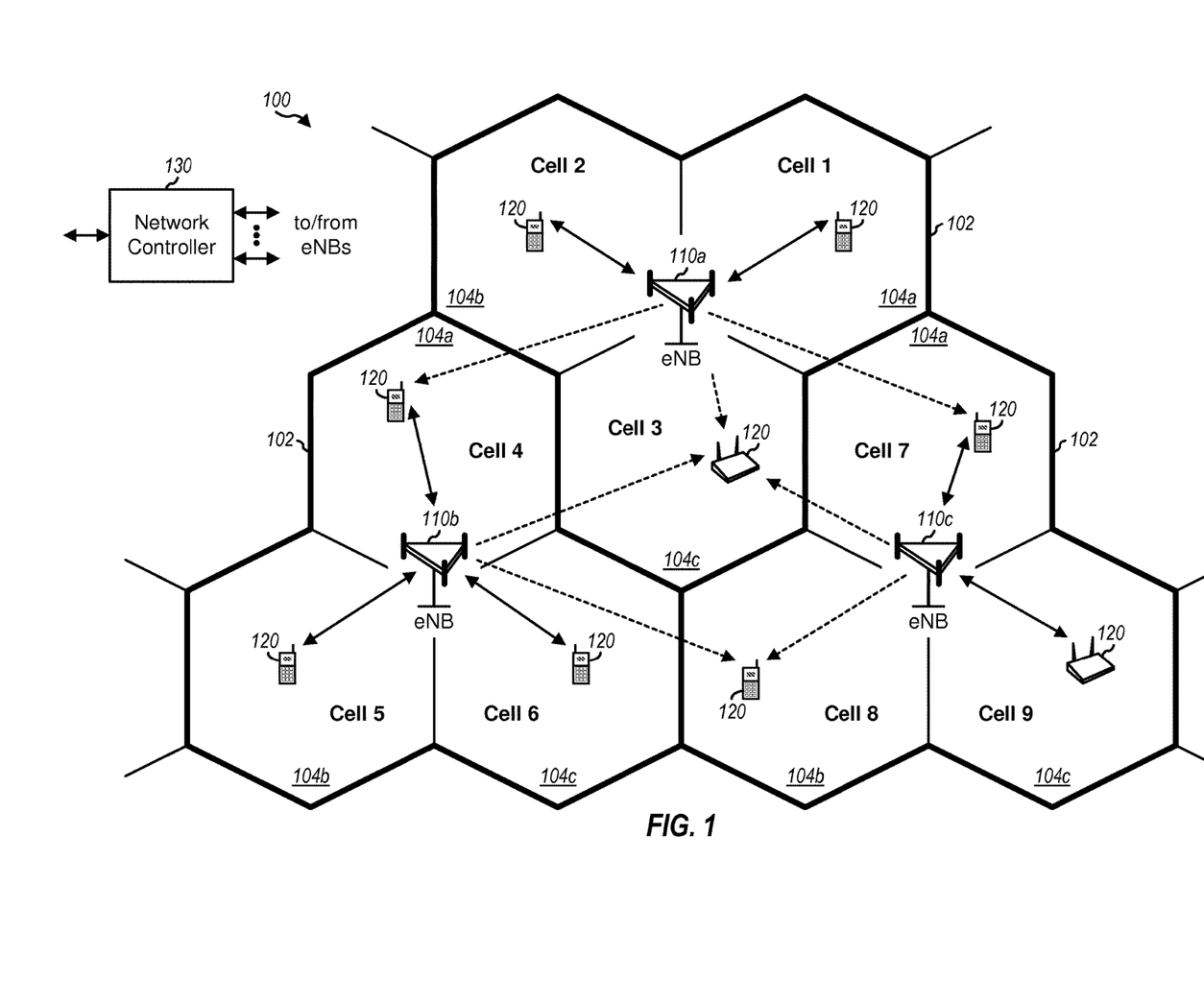
FIG. 1 shows a wireless communication network.

FIG. 1 shows a wireless communication network 100, which may be an LTE network or some other wireless network. Wireless network 100 may include a number of evolved Node Bs (eNBs) and other network entities. For simplicity, only three eNBs 110a, 110b and 110c and one network controller 130 are shown in FIG. 1. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area 102 of an eNB may be partitioned into multiple (e.g., three) smaller areas 104a, 104b and 104c. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB. In FIG. 1, a solid line with double arrows indicates bi-directional communication between an eNB and a UE. A dashed line with a single arrow indicates a UE receiving a downlink signal from an eNB, e.g., for broadcast and/or multicast services.

Wireless network 100 may support MBMS services for multiple UEs as well as unicast services for individual UEs. A MBMS service may be a broadcast service or a multicast service. The MBMS services may be supported with a multi-cell mode, a single-cell mode, and/or other modes. In the multi-cell mode, multiple cells may simultaneously send a MBMS transmission using multimedia broadcast single frequency network (MBSFN), which may allow a UE to combine the signals received from the multiple cells in order to improve reception performance. In the single-cell mode, a cell may send a MBSFN transmission by itself.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE to support MBMS and provides a short description of each channel.

TABLE 1

| Channel | Name | Type | Description |
| --- | --- | --- | --- |
| Broadcast Control Channel | BCCH | L | Carry system information. |
| Multicast Control Channel | MCCH | L | Carry MBMS control information. |
| Multicast Traffic Channel | MTCH | L | Carry data for MBMS services. |
| Broadcast Channel | BCH | T | Carry the BCCH |
| Multicast Channel | MCH | T | Carry the MTCH and MCCH. |
| Physical Broadcast Channel | PBCH | P | Carry the BCH. |
| Physical Multicast Channel | PMCH | P | Carry the MCH. |

The BCCH may carry system information blocks (SIBs), with each SIB including certain system information pertinent for communicating with and/or receiving data from a cell. The MCCH may carry control information used to receive MBMS services, e.g., a list of MBMS services with ongoing sessions, information used to receive the MTCH, etc. The MTCH may carry data for MBMS services.

Figure 2:
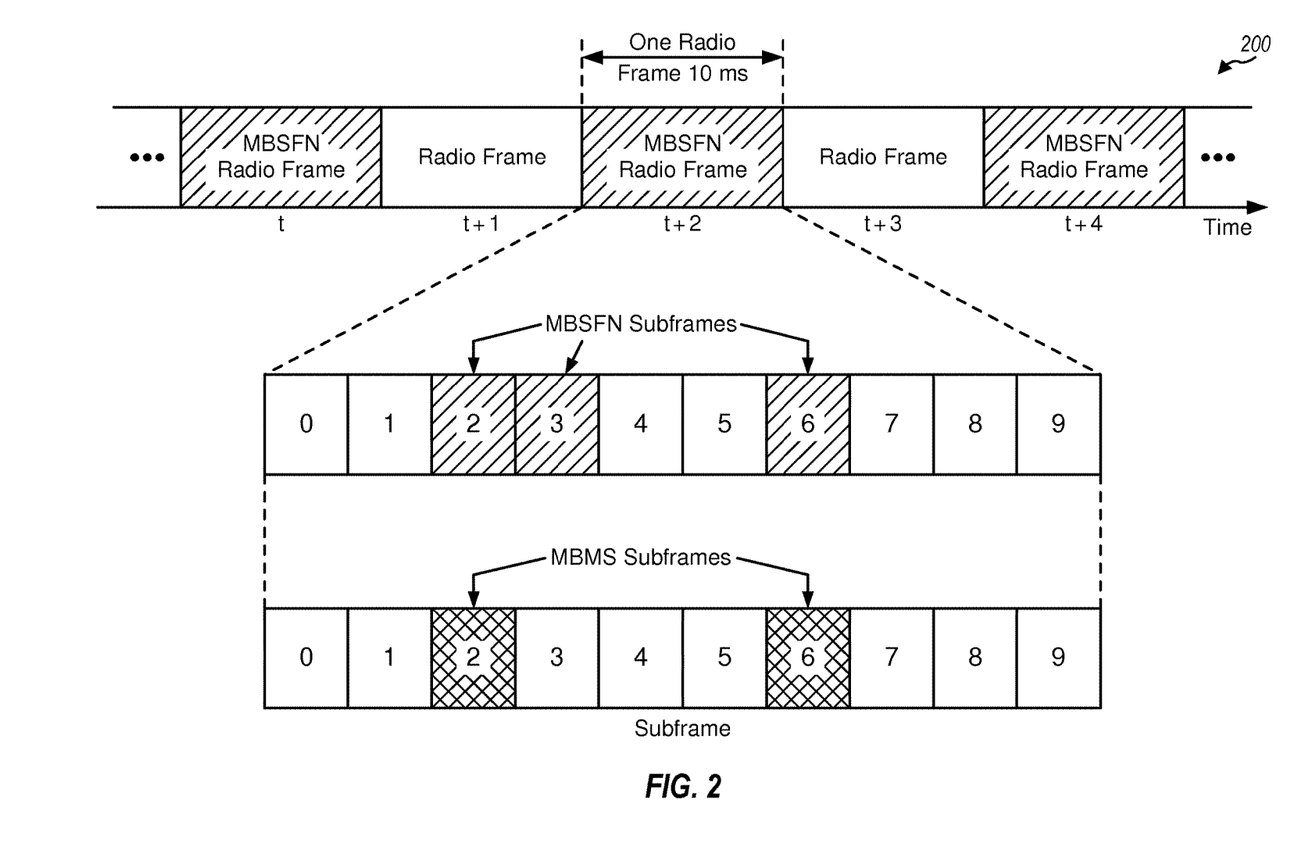
FIG. 2 shows an exemplary frame structure.

FIG. 2 shows an exemplary frame structure 200 for the downlink in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include L symbol periods, e.g., 14 symbol periods for a normal cyclic prefix or 12 symbol periods for an extended cyclic prefix (not shown in FIG. 2).

Some or all of the available radio frames for a cell may be designated as MBSFN radio frames. A MBSFN radio frame is a radio frame in which MBMS services and other designated services can be sent. In the example shown in FIG. 2, every other radio frame is designated as a MBSFN radio frame. Within each MBSFN radio frame, one or more subframes may be designated as MBSFN subframes. A MBSFN subframe is a subframe in which MBMS services and other designated services can be sent. A MBSFN subframe may have a format that is different from a regular subframe used to send unicast data to specific UEs. In the example shown in FIG. 2, subframes 2, 3 and 6 of each MBSFN radio frame are designated as MBSFN subframes. One or more MBSFN subframes in each MBSFN radio frame may be designated as MBMS subframes. A MBMS subframe is a subframe in which a MBMS transmission for MBMS services may be sent. In the example shown in FIG. 2, subframes 2 and 6 of each MBSFN radio frame are designated as MBMS subframes.

A group of cells in a MBSFN area may collectively send a MBMS transmission for a number of MBMS services, with each cell sending the same MBMS transmission. A UE may receive the MBMS transmission from the group of cells, which may appear as a single transmission to the UE. The group of cells may transmit one MCCH and one or more MTCHs for the MBMS transmission. The MCCH may carry control information for all MTCHs. Each MTCH may carry data for one or more MBMS services. The group of cells may transmit one or more MCHs. The MCCH may be sent in one MCH, and one or more MTCHs may be sent in each MCH. Multiple MCHs may be used support (i) different groups of MBMS services with different quality-of-service (QoS) requirements and/or (ii) more MBMS services.

Figure 3:
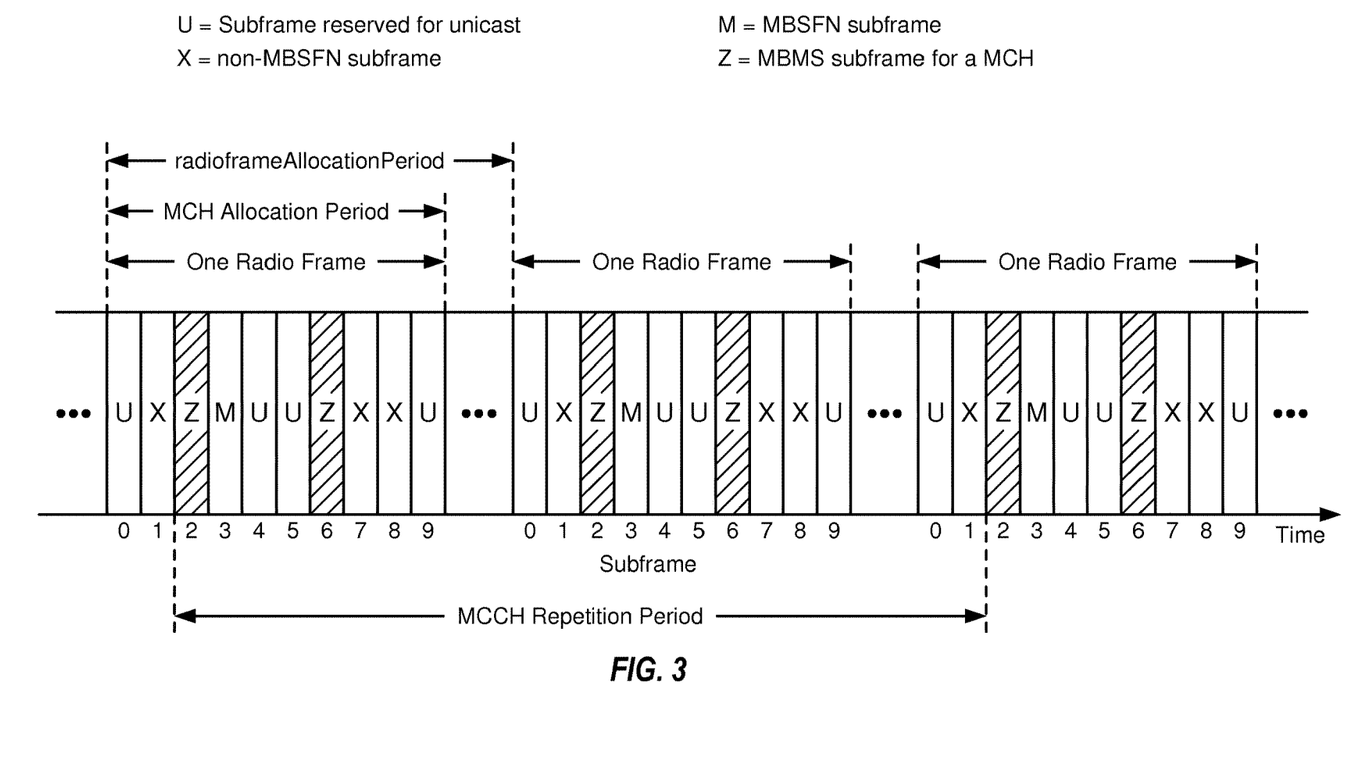
FIG. 3 shows subframes for MBMS services.

FIG. 3 shows an exemplary sequence of MBMS subframes for a MCH. The MCH may be sent in the sequence of MBMS subframes, which may be defined by a MCH subframe allocation pattern (MSAP). The MSAP indicates which ones of the MBSFN subframes are used for the MCH. In general, a MSAP for a MCH may include all or a subset of the available MBMS subframes. The MBMS subframes used for the MCH are referred to as MCH subframes and are denoted as "Z" in FIG. 3. The exemplary sequence of MBMS subframes in FIG. 3 corresponds to the exemplary MBMS configuration shown in FIG. 2 in which subframes 2, 3 and 6 in certain radio frames are MBSFN subframes. The sequence of MBMS subframes spans a particular time period, which may be referred to as a MCH allocation period, a MSAP period, a MSAP occasion, etc. The sequence of MBMS subframes would repeat in each MCH allocation period.

In the example shown in FIG. 3, the sequence of MBMS subframes spans a MCH allocation period of one MBSFN radio frame. The MBSFN radio frame includes three MBSFN subframes 2, 3, and 6, and the sequence of MBMS subframes includes MBMS subframes 2 and 6 in the MBSFN radio frame. In general, each MCH may be associated with a specific sequence of MBMS subframes defined by the MSAP for that MCH.

Figure 4:
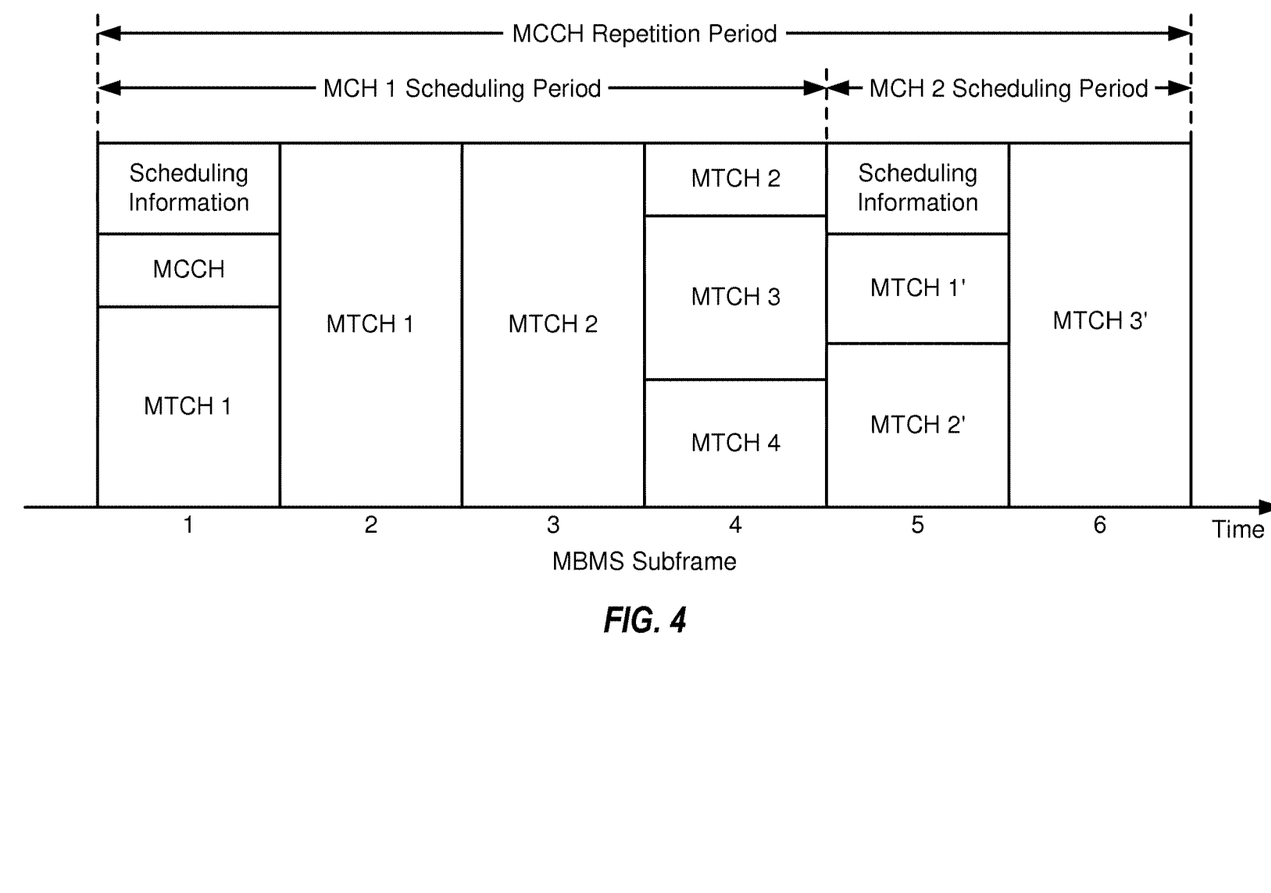
FIG. 4 shows exemplary transmissions of various channels for MBMS.

FIG. 4 shows exemplary transmissions of the MCCH and MTCHs. In the example shown in FIG. 4, a group of cells transmits two MCHs referred to as MCH 1 and MCH 2. The group of cells transmits the MCCH and MTCHs 1, 2, 3 and 4 in MCH 1 and transmits MTCHs 1', 2' and 3' in MCH 2. For clarity, FIG. 4 shows only MBMS subframes and omits all other subframes.

The group of cells may transmit scheduling information for each MCH in each MCH scheduling period. The scheduling information may also be referred to as MCH scheduling information (MSI), dynamic scheduling information (DSI), etc. In one design, the scheduling information for each MCH may convey which MBMS subframes in the current MCH scheduling period are used for the MTCHs sent in that MCH. The scheduling information may also convey other information used by the UEs to receive MBMS services of interest. The scheduling information may be sent in a Medium Access Control (MAC) control element, or in the MCCH, or via some other channel or mechanism.

The group of cells may transmit the MCCH at the start of each MCCH repetition period, prior to any MTCH. The group of cells may also transmit the MTCH(s) for each MCH as indicated by the scheduling information for that MCH.

In one design, information may be sent in system information block type 2 (SIB2) to convey the MBSFN subframes. The information used to convey the MBSFN subframes may be referred to as MBSFN subframe information. The MBSFN subframe information may have the following format:

```
MBSFN-SubframeConfigList ::= SEQUENCE (SIZE
(1.. maxMBSFN-Allocations))
   OF MBSFN-SubframeConfig
MBSFN-SubframeConfig  ::= SEQUENCE {
   radioframeAllocationPeriod  ENUMERATED {n1, n2, n4, n8, n16,
                                n32},
   radioframeAllocationOffset  INTEGER (0..7),
   subframeAllocation          CHOICE {
      oneFrame                 BIT STRING (SIZE(6)),
      fourFrames               BIT STRING (SIZE(24))
   }
}
```

In the design shown above, the MBSFN subframe information comprises a MBSFN-SubframeConfigList that specifies a subframe allocation pattern (SAP) for a set of MBSFN subframes. The MBSFN-SubframeConfigList includes one or more instances of MBSFN-SubframeConfig. Each MBSFN-SubframeConfig instance defines a sequence of MBSFN subframes based on three parameters. The radioframeAllocationPeriod parameter specifies the length of the MBSFN subframe sequence, which may be 1, 2, 4, 8, 18 or 32 radio frames. The radioframeAllocationOffset parameter specifies which radio frames are MBSFN radio frames and is given by an offset within a range of 0 to 7. Each radio frame is assigned a 12-bit system frame number (SFN). The SFN is reset to 0 at a specific time, is incremented by one for each radio frame thereafter, and wraps around to zero after reaching the maximum value of 4095. A radio frame is a MBSFN radio frame if its SFN satisfies the following:

$$(\text{SFN mod radioframeAllocationPeriod}) = \text{radioframeAllocationOffset}, \quad \text{Eq (1)}$$

where "mod" denotes a modulo operation.

Either one MBSFN radio frame or four consecutive MBSFN radio frames, starting with the radio frame that satisfies equation (1), may be defined. The subframeAllocation parameter specifies which subframes are MBSFN subframes and is given by (i) a 6-bit bitmap when one MBSFN radio frame is defined or (ii) a 24-bit bitmap when four consecutive MBSFN radio frames are defined. For FDD, each bitmap includes six bits corresponding to subframes 1, 2, 3, 6, 7 and 8 of each MBSFN subframe. For TDD, each bitmap includes five bits corresponding to subframes 3, 4, 7, 8 and 9 of each MBSFN subframe. Each bit may be set to either (i) '1' to indicate that the corresponding subframe is a MBSFN subframe or (ii) '0' to indicate that the corresponding subframe is not a MBSFN subframe. Subframes 0, 4, 5 and 9 in FDD and subframes 0, 1, 2, 5 and 6 in TDD are reserved for unicast. The bitmap in the subframeAllocation are used to specify the MBSFN subframes may be referred to as a MBSFN bitmap.

In the example shown in FIG. 3, a MBSFN-Subframe-Config has a radioframeAllocationPeriod of two radio frames and a subframeAllocation given by a G-bit MBSFN bitmap of '011100' for one MBSFN subframe. This bitmap indicates that (i) subframes 2, 3 and 6 in each MBSFN radio frame are MBSFN subframes and (ii) subframes 1, 7 and 8 in each MBSFN radio frame are not MBSFN subframes.

In an aspect, resources used for MBMS services may be provided with a multi-tier structure. In the first tier, the resources used for a MCCH may be signaled in a SIB. In the second tier, the resources for other channels (e.g., MTCHs and/or MCHs) for MBMS services may be signaled via the MCCH. In one design, the resources used for the MCCH may be given by specific subframes in which the MCCH is transmitted. The information conveying the resources (e.g., the subframes) used for the MCCH may be referred to as MCCH resource information.

In a first design, the MCCH resource information may be signaled in SIB2 and may include one or more of the following:
  MCCH identification—provide identity (ID) of the MCCH,
  MCCH subframe—indicate the subframe used for the MCCH,
  MCCH repetition period—indicate period in which the MCCH is repeated, and
  MCCH offset—indicate the starting radio frame for the MCCH repetition period.

Different MCCHs for different MBSFN areas may be assigned different MCCH IDs. The MCCH IDs may enable UEs supporting multiple MBSFN areas to distinguish the MCCHs for these different MBSFN areas.

For the first design, the MCCH resource information may rely on the MBSFN subframe information sent in SIB2. The MCCH resource information may be considered as an extension/addition to the SubframeConfigList sent in SIB2.

The MCCH subframe may be dependent on which subframes are designated as MBSFN subframes, which may be specified by the MBSFN-SubframeConfigList. In one design, the MCCH resource information may include an index of the MCCH subframe or an offset corresponding to the MCCH subframe. In another design, the MCCH resource information may include a bitmap that may indicate which subframe is the MCCH subframe.

The MCCH repetition period may indicate a period in which the MCCH is repeated. The MCCH repetition period may be given in units of radio frames (which is assumed below) or subframes. The MCCH repetition period may or may not match the radioframeAllocationPeriod used to specify MBSFN subframes. For example, in FIG. 3, the MCCH repetition period may be four radio frames and may cover two radioframeAllocationPeriods. In one design, the MCCH repetition period may start at the first MBSFN radio frame, as shown in FIG. 3. In this design, the MCCH offset may be equal to zero and may be omitted. In another design, the MCCH offset may be used to specify any MBSFN radio frame to use as the start of the MCCH repetition period.

In a second design, the MCCH resource information may be signaled in another SIB, which may be referred to as SIBx. For example, SIBx may correspond to SIB 13 or some other SIB. SIBx may include one or more of the following:
  MCCH identification—indicate identity of the MCCH,
  MBMS subframe allocation—indicate subframes available for MBMS services,
  MCCH subframe—indicate the subframe used for the MCCH,
  MCCH repetition period—indicate period in which the MCCH is repeated, and
  MCCH offset—indicate the starting radio frame for the MCCH repetition period.

For the second design, SIBx can convey the resources used for the MCCH without relying on the MBSFN subframe information sent in SIB2. In particular, SIBx may include (i) the MCCH resource information sent in SIB2 for the first design and (ii) MBMS subframe information indicative of MBMS subframes. In one design, the MBMS subframe information may comprise the MBSFN-SubframeConfigList. In another design, the MBMS subframe information may be combined with the other information. For example, a single bitmap may be sent in SIBx to convey the MCCH subframe, instead of sending both a MBSFN bitmap for MBMS subframes and a MCH bitmap for subframes for a MCH transporting the MCCH.

For both the first and second designs, a cell may send MCCH resource information for multiple MCCHs for multiple MBSFN areas. In this case, some of the information may be aggregated or presented in other formats. For example, a single MCCH repetition period may be sent for multiple MCCHs instead of for each MCCH. A bitmap may also be used to convey the MCCH subframes for the multiple MCCHs.

For both the first and second designs, the MCCH resource information may also comprise other parameters instead of and/or in addition to the parameters listed above. Furthermore, SIB2 or SIBx may include other information used to receive the MCCH. For example, SIB2 or SIBx may include MCH information indicative of parameters for a MCH transporting the MCCH. For example, the MCH information may include a modulation and coding scheme (MCS) for the MCH, resources used to send the MCH, etc.

Figure 5A:
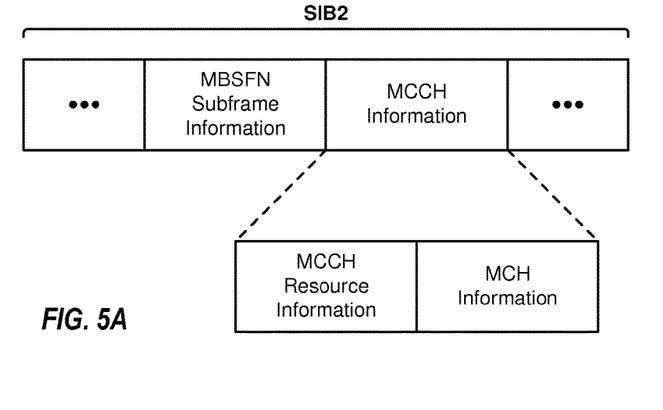
FIGS. 5A and 5B show diagrams of SIBs carrying information for a MCCH.

FIG. 5A shows a diagram of SIB2 for the first design. SIB2 may include various types of information such as MBSFN subframe information, MCCH information, etc. The MBSFN subframe information may include the MBSFN-SubframeConfigList described above. The MCCH information may include MCCH resource information, MCH information, etc. The MCCH resource information may include the items described above for the first design. The MCH information may include the MCS for the MCH transporting the MCCH, etc.

Figure 5B:
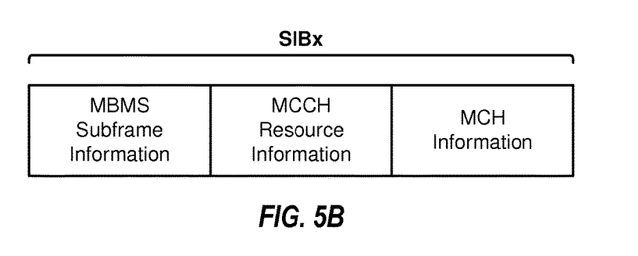

FIG. 5B shows a diagram of SIBx for the second design. SIBx may include various types of information such as MBMS subframe information, MCCH resource information, MCH information, etc. The MBMS subframe information may include the MBMS subframe allocation described above for the second design. The MCCH resource information may include the remaining items described above for the second design. The MCH information may include the MCS for the MCH transporting the MCCH, etc.

In one design, the MCCH may carry information used to receive one or more MCHs covered by the MCCH. In one design, the MCCH may carry information indicating the MSAP for each MCH, which may be referred to as MCH subframe information. In one design, the MCH subframe information may include the following:
  MCH allocation period—indicate the period of the MSAP for the MCH,
  MCH subframe allocation—indicate which subframes are used for the MCH, and
  MCH scheduling period—indicate the period in which scheduling information for the MCH is repeated.

In one design, the MCH allocation period/MSAP period may be the same as the radioframeAllocationPeriod for MBSFN subframes. In another design, the MCH allocation period may be different from the radioframeAllocationPeriod.

In one design, the MCH subframe allocation may be conveyed by a bitmap, which may be referred to as a MCH bitmap. In one design, the MCH bitmap may include one bit for each MBSFN subframe in the MCH allocation period. Each bit in the MCH bitmap may be set to either (i) '1' to indicate that the MBSFN subframe is a MCH subframe, or (ii) '0' to indicate that the MBSFN subframe is not a MCH subframe. For the example shown in FIG. 3, the MCH allocation period may be equal to one radio frame, and the MCH bitmap may include three bits for the three MBSFN subframes in one MBSFN radio frame. The three bits in the MCH bitmap may be set to '101' to indicate that the first and last MBSFN subframes are MCH subframes and that the middle MBSFN subframe is not a MCH subframe. In another design, the MCH bitmap may have the same size as the MBSFN bitmap. For the example shown in FIG. 3, the MCH bitmap may include six bits that may be set to '010100' to indicate that subframes 2 and 6 are MCH subframes and subframes 1, 3, 7 and 8 are not MCH subframes. In another design, the MCH subframes may be indicated in other manners, e.g., with an index for each MCH subframe.

The MCH subframe information may also include other parameters instead of and/or in addition to the parameters listed above. The MCCH may also carry other information used to receive one or more MCHs and/or MTCHs covered by the MCCH. For example, the MCCH may carry a modulation and coding scheme for each MCH covered by the MCCH.

Figure 6:
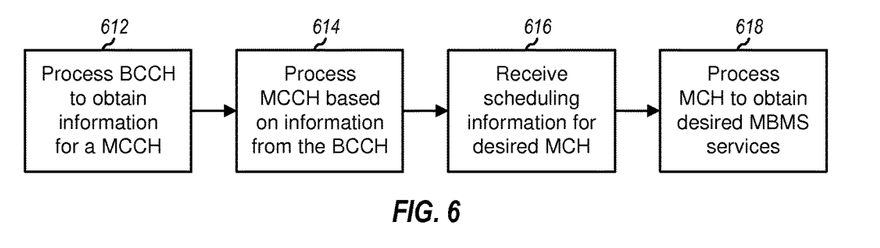
FIG. 6 shows a design of a process for receiving MBMS services by a UE.

FIG. 6 shows a design of a process 600 for receiving MBMS services by a UE. The UE may initially process the BCCH to obtain a SIB (e.g., SIB2 or SIBx) carrying information for a MCCH (block 612). The MCCH information may include (i) MCCH resource information indicating the MCCH subframes and the MCCH repetition period, (ii) MCH information (e.g., a MCS) used to process a MCH carrying the MCCH, and/or (iii) other information. The UE may process the MCCH based on the information obtained from the BCCH (block 614). The MCCH may span multiple SAPs or MBSFN-SubframeConfiglists in SIB2. Hence, the UE may decode the MCCH by considering all resources in possibly multiple SAPs with the same MCCH identification. The UE may obtain various types of information from the MCCH such as (i) information on the MSAP for each MCH, which may be based on the information on MBSFN subframes sent in SIB2 or SIBx, (ii) MCH information (e.g., a MCS) used to process each MCH covered by the MCCH, (iii) a mapping of MBMS services to MCHs, and/or (iv)

other information such as a logical channel ID of each MTCH. The UE may receive scheduling information for each MCH of interest (block 616). The scheduling information may indicate whether or not each MBMS service is scheduled, the resources (e.g., subframes) in which each scheduled MBMS service is sent, etc. The UE may then process each MCH of interest based on the scheduling information and other pertinent information to obtain the desired MBMS services (block 618).

As shown in FIG. 6, the UE may be interested in MBSFN services and may determine which resources are used for the MBSFN services, including control information and traffic data. The resources used for the MCCH carrying control information may be obtained via the BCCH. Once the UE obtains this information, the UE can process the MCCH and obtain information on all MSAPs and other relevant information for all MCHs of interest. The UE may then process the MCHs and MTCHs of interest based on the acquired information.

In the designs described above, the BCCH may only point to the resources where one or more MCCHs can be found and may not indicate the availability of MBMS services. Each MCCH may carry additional information used to process one or more MCHs and obtain the desired MBMS services. This two-tier structure may provide an efficient means to broadcast pertinent information to allow the UEs to receive MBMS services without overly burdening the BCCH.

Figure 7:
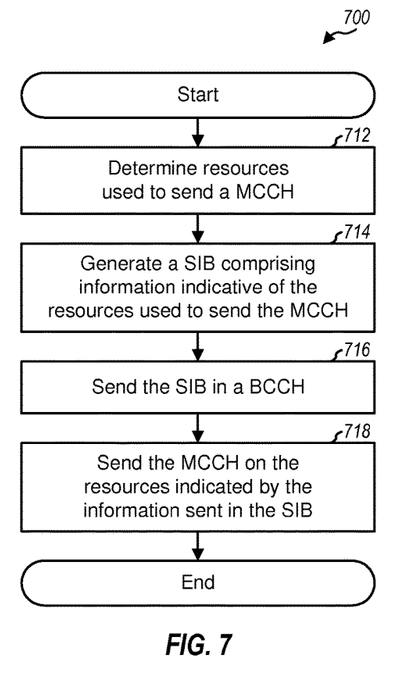
FIG. 7 shows a process for supporting MBMS services.

FIG. 7 shows a design of a process 700 for supporting MBMS services. Process 700 may be performed by a base station/cell (as described below) or by some other entity. The cell may determine resources used to send a MCCH (block 712). The cell may generate a SIB comprising information indicative of the resources used to send the MCCH (block 714). The SIB may be SIB2 or SIBx, where x may be any value greater than 2. The cell may send the SIB in a BCCH (block 716). The cell may send the MCCH on the resources indicated by the information sent in the SIB (block 718).

In one design of block 712, the cell may determine a subframe in which the MCCH is sent, or a repetition period for the MCCH, or an offset indicative of the start of the repetition period for the MCCH, or some other information, or a combination thereof. The cell may send the information in the SIB. The cell may also generate the SIB further comprising other information such as identification of the MCCH, a MCS for a MCH transporting the MCCH, the subframes available to send MBMS services, etc.

The MCCH may carry information used to receive MBMS services. In one design, the MCCH may carry control information for at least one MCH carrying data for MBMS services. The cell may determine at least one MSAP for the at least one MCH, with each MSAP indicating subframes used for a corresponding MCH. The cell may send the at least one MSAP in the MCCH. In one design, the cell may determine at least one MCS for the at least one MCH and may send the at least one MCS for the at least one MCH in the MCCH. In one design, the cell may determine a mapping of MBMS services to the at least one MCH and may send the mapping in the MCCH. The MCCH may also carry other information used to receive MBMS services.

Figure 8:
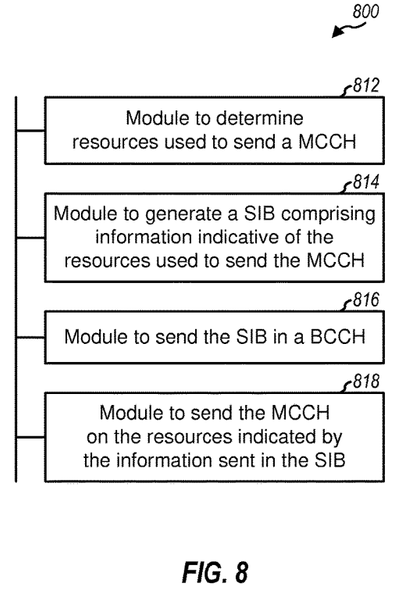
FIG. 8 shows an apparatus for supporting MBMS services.

FIG. 8 shows a design of an apparatus 800 for supporting MBMS services. Apparatus 800 includes a module 812 to determine resources used to send a MCCH, a module 814 to generate a SIB comprising information indicative of the resources used to send the MCCH, a module 816 to send the SIB in a BCCH, and a module 818 to send the MCCH on the resources indicated by the information sent in the SIB.

Figure 9:
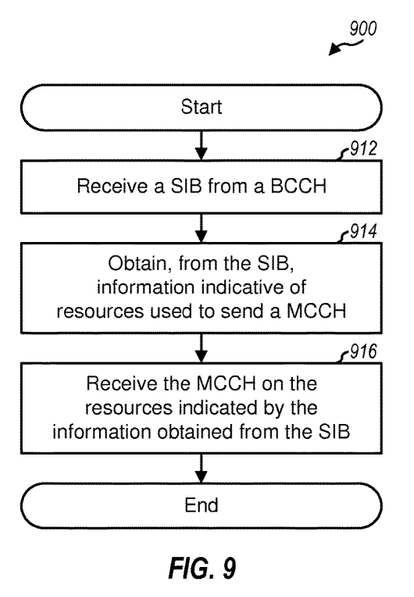
FIG. 9 shows a process for receiving MBMS services.

FIG. 9 shows a design of a process 900 for receiving MBMS services. Process 900 may be performed by a UE (as described below) or by some other entity. The UE may receive a SIB (e.g., SIB2 or SIBx) from a BCCH (block 912). The UE may obtain, from the SIB, information indicative of resources used to send a MCCH (block 914). The UE may receive the MCCH on the resources indicated by the information obtained from the SIB (block 916).

In one design, the information obtained from the SIB may comprise information indicative of a subframe in which the MCCH is sent, or a repetition period for the MCCH, or an offset indicative of the start of the repetition period for the MCCH, or some other information, or a combination thereof. The UE may also obtain other information from the SIB such as identification of the MCCH, the subframes available to send MBMS services, a MCS for a MCH transporting the MCCH, etc. The UE may determine the subframe in which the MCCH is sent based on the information indicative of the subframes available to send MBMS services. The UE may decode the MCH based on the MCS to recover the MCCH.

The MCCH may carry control information for at least one MCH carrying data for MBMS services. The UE may obtain information used to receive MBMS services from the MCCH. In one design, the UE may obtain at least one MSAP for the at least one MCH from the MCCH, with each MSAP indicating subframes used for a corresponding MCH. The UE may process subframes indicated by the at least one MSAP to recover the at least one MCH. In one design, the UE may obtain at least one MCS for the at least one MCH from the MCCH and may decode the at least one MCH based on the at least one MCS. In one design, the UE may obtain a mapping of MBMS services to the at least one MCH from the MCCH and may receive at least one MBMS service of interest based on the mapping. The UE may also obtain other information from the MCCH.

Figure 10:
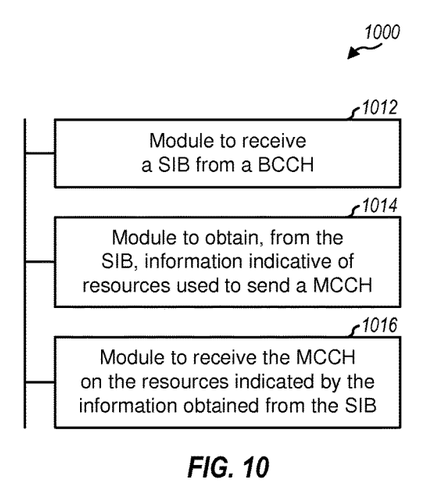
FIG. 10 shows an apparatus for receiving MBMS services.

FIG. 10 shows a design of an apparatus 1000 for receiving scheduling information for MBMS services. Apparatus 1000 includes a module 1012 to receive a SIB from a BCCH, a module 1014 to obtain, from the SIB, information indicative of resources used to send a MCCH, and a module 1016 to receive the MCCH on the resources indicated by the information obtained from the SIB.

The modules in FIGS. 8 and 10 may comprise processors, electronic devices, hardware devices, electronic components, logical circuits, memories, software codes, firmware codes, etc., or any combination thereof.

Figure 11:
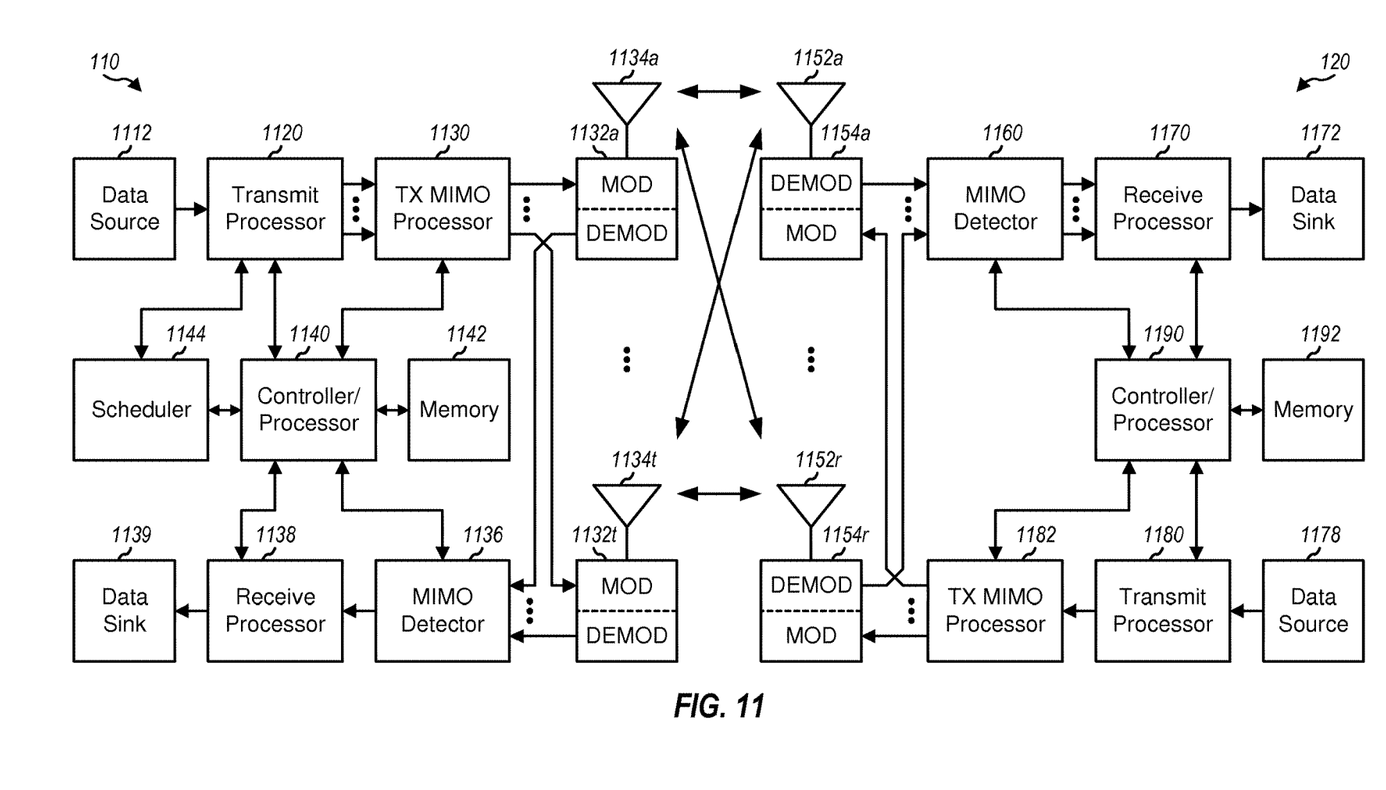
FIG. 11 shows a block diagram of a base station and a UE.

FIG. 11 shows a block diagram of a design of a base station/eNB 110 and a UE 120, which may be one of the base stations/eNBs and one of the UEs in FIG. 1. In this design, base station 110 may be equipped with T antennas 1134a through 1134t, and UE 120 may be equipped with R antennas 1152a through 1152r, where in general T≥1 and R≥1.

At base station 110, a transmit processor 1120 may receive data for unicast services and data for MBMS services from a data source 1112. Transmit processor 1120 may process the data for each service to obtain data symbols. Transmit processor 1120 may also receive overhead information from a controller/processor 1140 and/or a scheduler 1144 and may process the overhead information to obtain overhead symbols. The overhead information may comprise system information, MCCH resource information, MCH information, MBMS subframe information, etc. A transmit (TX) multiple-input multiple-output (MIMO) processor 1130 may multiplex the data symbols, the overhead symbols, with reference symbols. Processor 1130 may further process (e.g., precode) the multiplexed symbols (if applicable) and may provide T output symbol streams to T modulators (MOD) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and other base stations and may provide received signals to demodulators (DEMOD) 1154a through 1154r, respectively. Each demodulator 1154 may condition (e.g., filter, amplify, downconvert, and digitize) a respective received signal to obtain received samples and may further process the received samples (e.g., for OFDM, etc.) to obtain received symbols. A MIMO detector 1160 may obtain the received symbols from all R demodulators 1154a through 1154r, perform MIMO detection on the received symbols (if applicable), and provide detected symbols. A receive processor 1170 may process the detected symbols, provide decoded data for UE 120 and/or the desired MBMS services to a data sink 1172, and provide decoded overhead information to a controller/processor 1190.

On the uplink, at UE 120, data from a data source 1178 and control information from a controller/processor 1190 may be processed by a transmit processor 1180, further processed by a TX MIMO processor 1182 (if applicable), conditioned by modulators 1154a through 1154r, and transmitted via antennas 1152a through 1152r. At base station 110, the uplink signals from UE 120 may be received by antennas 1134, conditioned by demodulators 1132, detected by a MIMO detector 1136, and processed by a receive processor 1138 to obtain the data and control information transmitted by UE 120.

Controllers/processors 1140 and 1190 may direct the operation at base station 110 and UE 120, respectively. Processor 1140 and/or other processors and modules at base station 110 may implement or direct process 700 in FIG. 7 and/or other processes for the techniques described herein. Processor 1190 and/or other processors and modules at UE 120 may implement or direct process 900 in FIG. 9 and/or other processes for the techniques described herein. Memories 1142 and 1192 may store data and program codes for base station 110 and UE 120, respectively. Scheduler 1144 may schedule UEs for data transmission, schedule MBMS services, and assign resources to the scheduled UEs and MBMS services. Controller/processor 1140 and/or scheduler 1144 may provide information for the MBMS services, e.g., MCCH resource information, MCH information, MBMS subframe information, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting multimedia broadcast/multicast services (MBMS), comprising:
   determining at least one modulation and coding scheme (MCS) for at least one multicast channel (MCH);
   generating a system information block (SIB) comprising the at least one MCS for the at least one MCH and information indicating resources including at least one multicast control channel (MCCH) subframe used for sending a MCCH;
   sending the SIB including the at least one MCS for the at least one MCH and information indicating resources including at least one MCCH subframe used for sending the MCCH in a broadcast control channel (BCCH);
   determining at least one MCH subframe allocation pattern (MSAP) for one or more of the at least one MCH carrying data for MBMS services, each MSAP indicating subframes used for a corresponding MCH, wherein the subframes indicated by each MSAP comprise a subset of subframes available to send the MBMS services; and
   sending the at least one MSAP in the MCCH.

2. The method of claim 1, further comprising:
   determining the resources used to send the MCCH.

3. The method of claim 2, wherein the determining the resources used to send the MCCH comprises determining a subframe in which the MCCH is sent, or a repetition period for the MCCH, or an offset indicative of the start of the repetition period for the MCCH, or a combination thereof.

4. The method of claim 1, wherein the SIB is a system information block type x (SIBx), where x is a value greater than 2.

5. The method of claim 1, further comprising:
   determining the subframes available to send the MBMS services;
   generating system information comprising information indicative of the subframes available to send the MBMS services; and
   sending the system information in the BCCH.

6. The method of claim 1, further comprising:
   determining at least one MCS for the one or more of the at least one MCH carrying data for the MBMS services; and
   sending the at least one MCS for the one or more of the at least one MCH in the MCCH.

7. The method of claim 1, further comprising:
   determining a mapping of the MBMS services to the one or more of the at least one MCH carrying data for the MBMS services; and
   sending the mapping in the MCCH.

8. The method of claim 1, wherein the SIB is a system information block type 13 (SIB 13).

9. An apparatus for supporting multimedia broadcast/multicast services (MBMS), comprising:
   means for determining at least one modulation and coding scheme (MCS) for at least one multicast channel (MCH);
   means for generating a system information block (SIB) comprising the MCS for the at least one MCH and information indicating resources including at least one multicast control channel (MCCH) subframe used for sending a MCCH;
   means for sending the SIB including the at least one MCS for the at least one MCH and information indicating resources including at least one MCCH subframe used for sending the MCCH in a broadcast control channel (BCCH);
   means for determining at least one MCH subframe allocation pattern (MSAP) for one or more of the at least one MCH carrying data for MBMS services, each MSAP indicating subframes used for a corresponding MCH, wherein the subframes indicated by each MSAP comprise a subset of subframes available to send the MBMS services; and
   means for sending the at least one MSAP in the MCCH.

10. The apparatus of claim 9, further comprising: means for determining resources used to send the MCCH.

11. The apparatus of claim 10, wherein the means for determining the resources used to send the MCCH is configured to determine a subframe in which the MCCH is sent, or a repetition period for the MCCH, or an offset indicative of the start of the repetition period for the MCCH, or a combination thereof.

12. The apparatus of claim 9, wherein the SIB is a system information block type x (SIBx), where x is a value greater than 2.

13. The apparatus of claim 9, further comprising:
    means for determining the subframes available to send the MBMS services;
    means for generating system information comprising information indicative of the subframes available to send the MBMS services; and
    means for sending the system information in the BCCH.

14. The apparatus of claim 9, further comprising:
    means for determining at least one MCS for the one or more of the at least one MCH carrying data for the MBMS services; and
    means for sending the at least one MCS for the one or more of the at least one MCH in the MCCH.

15. The apparatus of claim 9, further comprising:
    means for determining a mapping of the MBMS services to the one or more of the at least one MCH carrying data for the MBMS services; and
    means for sending the mapping in the MCCH.

16. A method of receiving multimedia broadcast/multicast services (MBMS), comprising:
    receiving a system information block (SIB) from a broadcast control channel (BCCH);
    obtaining, from the SIB, at least one modulation and coding scheme (MCS) for at least one multicast channel (MCH) and information indicating resources including at least one multicast control channel (MCCH) subframe used for sending a MCCH;
    decoding the at least one MCH based on the at least one MCS;
    obtaining at least one MCH subframe allocation pattern (MSAP) for the at least one MCH from the MCCH, each MSAP indicating subframes used for a corresponding MCH, wherein the subframes indicated by each MSAP comprise a subset of subframes available to send MBMS services; and processing the subframes indicated by the at least one MSAP to recover one or more of the at least one MCH carrying data for the MBMS services.

17. The method of claim 16, further comprising:
receiving the MCCH on the resources indicated by the information obtained from the SIB.

18. The method of claim 17, wherein the information obtained from the SIB is indicative of a subframe in which the MCCH is sent, or a repetition period for the MCCH, or an offset indicative of the start of the repetition period for the MCCH, or a combination thereof.

19. The method of claim 16, wherein the SIB is a system information block type x (SIBx), where x is a value greater than 2.

20. The method of claim 16, further comprising:
receiving system information from the BCCH;
obtaining, from the system information, information indicative of the subframes available to send the MBMS services; and
determining the subframe in which the MCCH is sent based on the information indicative of the subframes available to send the MBMS services.

21. The method of claim 16, further comprising:
obtaining at least one MCS for the one or more of the at least one MCH from the MCCH; and
decoding the one or more of the at least one MCH based on the at least one MCS to obtain data for at least one MBMS service.

22. The method of claim 16, further comprising:
obtaining a mapping of the MBMS services to the one or more of the at least one MCH from the MCCH; and
receiving at least one MBMS service based on the mapping.

23. The method of claim 16, wherein the SIB is a system information block type 13 (SIB13).

24. An apparatus for receiving multimedia broadcast/multicast services (MBMS), comprising:
means for receiving a system information block (SIB) from a broadcast control channel (BCCH);
means for obtaining, from the SIB, at least one modulation and coding scheme (MCS) for at least one multicast channel (MCH) and information indicating resources including at least one multicast control channel (MCCH) subframe used for sending a MCCH;
means for decoding the at least one MCH based on the at least one MCS;
means for obtaining at least one MCH subframe allocation pattern (MSAP) for the at least one MCH from the MCCH, each MSAP indicating subframes used for a corresponding MCH, wherein the subframes indicated by each MSAP comprise a subset of subframes available to send MBMS services; and
means for processing the subframes indicated by the at least one MSAP to recover one or more of the at least one MCH carrying data for the MBMS services.

25. The apparatus of claim 24, further comprising:
means for receiving the MCCH on the resources indicated by the information obtained from the SIB.

26. The apparatus of claim 25, wherein the information obtained from the SIB is indicative of a subframe in which the MCCH is sent, or a repetition period for the MCCH, or an offset indicative of the start of the repetition period for the MCCH, or a combination thereof.

27. The apparatus of claim 24, wherein the SIB is a system information block type x (SIBx), where x is a value greater than 2.

28. The apparatus of claim 24, further comprising:
means for receiving system information from the BCCH;
means for obtaining, from the system information, information indicative of the subframes available to send the MBMS services; and
means for determining the subframe in which the MCCH is sent based on the information indicative of the subframes available to send the MBMS services.

29. The apparatus of claim 24, further comprising:
means for obtaining at least one MCS for the one or more of the at least one MCH from the MCCH; and
means for decoding the one or more of the at least one MCH based on the at least one MCS to obtain data for at least one MBMS service.

30. The apparatus of claim 24, further comprising:
means for obtaining a mapping of the MBMS services to the one or more of the at least one MCH from the MCCH; and
means for receiving at least one MBMS service based on the mapping.

* * * * *